(12) United States Patent
Morris et al.

(10) Patent No.: US 9,428,046 B2
(45) Date of Patent: Aug. 30, 2016

(54) ALIGNMENT AND RETENTION SYSTEM FOR LATERALLY SLIDEABLY ENGAGEABLE MATING COMPONENTS

(71) Applicant: GM GLOBAL TECHNOLOGY OPERATIONS LLC, Detroit, MI (US)

(72) Inventors: Steven E. Morris, Fair Haven, MI (US); Michael J. Wightman, Fowlerville, MI (US); Jennifer P. Lawall, Waterford, MI (US); Gordan N. Noll, St. Clair Shores, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/538,000

(22) Filed: Nov. 11, 2014

(65) Prior Publication Data

US 2015/0283898 A1 Oct. 8, 2015

Related U.S. Application Data

(60) Provisional application No. 61/974,107, filed on Apr. 2, 2014.

(51) Int. Cl.
*B60K 15/05* (2006.01)
*E05D 7/00* (2006.01)
(Continued)

(52) U.S. Cl.
CPC .................. *B60K 15/05* (2013.01); *E05D 1/02* (2013.01); *E05D 7/00* (2013.01); *E05F 7/005* (2013.01);
(Continued)

(58) Field of Classification Search
CPC ... B60K 15/05; B60K 2015/053; E05F 7/04; E05F 7/00; E05F 7/005; F16B 5/0664
USPC ...................................................... 296/97.22
See application file for complete search history.

(56) References Cited

U.S. PATENT DOCUMENTS

| 1,219,398 A | 3/1917 | Huntsman |
| 1,261,036 A | 4/1918 | Kerns |

(Continued)

FOREIGN PATENT DOCUMENTS

| BE | 842302 A | 9/1976 |
| CN | 1036250 A | 10/1989 |

(Continued)

OTHER PUBLICATIONS

Rojas, F.E., et al., "Kinematic Coupling for Precision Fixturing & Assembly" MIT Precision Engineering Research Group, Apr. 2013.
(Continued)

*Primary Examiner* — Gregory Strimbu
(74) *Attorney, Agent, or Firm* — Cantor Colburn LLP

(57) ABSTRACT

An elastically averaged alignment system includes a first component having first and second alignment features, and a second component having third and fourth elastically deformable alignment elements. The first and second components are laterally slidably engageable with each other. The third elastically deformable alignment element is configured and disposed to interferingly, deformably and matingly engage with the first alignment feature. The fourth elastically deformable alignment element is configured and disposed to interferingly, deformably and matingly engage with the second alignment feature. Portions of the third and fourth elastically deformable alignment elements when engaged with respective ones of the first and second alignment features elastically deform to an elastically averaged final configuration that aligns the first component relative to the second component in six orthogonal directions by averaging the elastic deformation of the respective elastically deformable alignment elements.

10 Claims, 5 Drawing Sheets

(51) Int. Cl.
*E05D 1/02* (2006.01)
*E05F 7/00* (2006.01)
*E05F 7/04* (2006.01)
*E05F 5/00* (2006.01)

(52) U.S. Cl.
CPC ........... *E05F 7/04* (2013.01); *B60K 2015/053* (2013.01); *E05F 5/00* (2013.01); *E05Y 2900/10* (2013.01); *E05Y 2900/50* (2013.01); *Y10T 16/525* (2015.01)

(56) References Cited

U.S. PATENT DOCUMENTS

| | | |
|---|---|---|
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyi |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A | 5/1981 | Delattre |
| 4,300,851 A | 11/1981 | Thelander |
| 4,313,609 A | 2/1982 | Clements |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,481,160 A | 11/1984 | Bree |
| 4,527,760 A | 7/1985 | Salacuse |
| 4,575,060 A | 3/1986 | Kitagawa |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,745,656 A | 5/1988 | Revlett |
| 4,757,655 A | 7/1988 | Jentoft |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |
| 5,165,749 A * | 11/1992 | Sheppard ............... B60K 15/05 220/86.2 |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,419,358 A | 5/1995 | Sun |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |

(56) References Cited

U.S. PATENT DOCUMENTS

| | | |
|---|---|---|
| 5,556,808 A | 9/1996 | Williams et al. |
| 5,566,840 A | 10/1996 | Waldner et al. |
| 5,575,601 A | 11/1996 | Skufca |
| 5,577,301 A | 11/1996 | De Maagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A | 12/1997 | Mirabitur |
| 5,706,559 A | 1/1998 | Oliver |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,289,560 B1 | 9/2001 | Guyot |
| 6,299,478 B1 | 10/2001 | Jones et al. |
| 6,318,585 B1 | 11/2001 | Asagiri |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,872,053 B2 | 3/2005 | Bucher |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | DiCesare |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren |
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |

(56) References Cited

U.S. PATENT DOCUMENTS

| | | |
|---|---|---|
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,572,818 B2 | 11/2013 | Hofmann |
| 8,579,141 B2 | 11/2013 | Tejima |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 2001/0016986 A1 | 8/2001 | Bean |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yi |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1* | 7/2006 | Engel ............... B60K 15/05 296/97.22 |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1* | 10/2007 | Hirano ............... B60K 15/05 206/752 |
| 2007/0251055 A1* | 11/2007 | Gerner ............... B60K 15/05 16/221 |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1* | 10/2010 | Schoenow ............. B60K 15/05 70/101 |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |

(56) References Cited

U.S. PATENT DOCUMENTS

| | | |
|---|---|---|
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1* | 1/2013 | Morris ............... B25B 27/00 29/466 |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1* | 2/2014 | Morris ............... F16B 17/00 29/407.09 |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1* | 2/2014 | Colombo ............ B25B 11/02 29/407.09 |
| 2014/0047697 A1 | 2/2014 | Morris |
| 2014/0080036 A1 | 3/2014 | Smith et al. |
| 2014/0132023 A1 | 5/2014 | Watanabe |
| 2014/0159412 A1 | 6/2014 | Morris et al. |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0043959 A1 | 2/2015 | Morris |
| 2015/0050068 A1 | 2/2015 | Morris et al. |
| 2015/0052725 A1 | 2/2015 | Morris et al. |
| 2015/0056009 A1 | 2/2015 | Morris |
| 2015/0063943 A1 | 3/2015 | Morris |
| 2015/0069779 A1 | 3/2015 | Morris et al. |
| 2015/0078805 A1 | 3/2015 | Morris et al. |
| 2015/0086265 A1 | 3/2015 | Morris |
| 2015/0093177 A1 | 4/2015 | Morris |
| 2015/0093178 A1 | 4/2015 | Morris |
| 2015/0093179 A1 | 4/2015 | Morris et al. |
| 2015/0098748 A1 | 4/2015 | Morris et al. |
| 2015/0135509 A1 | 5/2015 | Morris et al. |
| 2015/0165609 A1 | 6/2015 | Morris et al. |
| 2015/0165985 A1 | 6/2015 | Morris |
| 2015/0165986 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1 | 6/2015 | Morris et al. |
| 2015/0175219 A1 | 6/2015 | Kiester |
| 2015/0176759 A1 | 6/2015 | Morris et al. |
| 2015/0194650 A1 | 7/2015 | Morris et al. |
| 2015/0197970 A1 | 7/2015 | Morris et al. |
| 2015/0232130 A1 | 8/2015 | Colombo |
| 2015/0232131 A1 | 8/2015 | Morris et al. |
| 2015/0274217 A1 | 10/2015 | Colombo |
| 2015/0291222 A1 | 10/2015 | Colombo et al. |
| 2015/0375798 A1 | 12/2015 | Morris et al. |

FOREIGN PATENT DOCUMENTS

| | | |
|---|---|---|
| CN | 1129162 A | 8/1996 |
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 101005741 A | 7/2007 |
| CN | 200941716 Y | 8/2007 |
| CN | 101250964 A | 8/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 202686206 U | 1/2013 |
| CN | 102939022 A | 2/2013 |
| CN | 202764872 U | 3/2013 |
| CN | 202987018 U | 6/2013 |
| CN | 103201525 A | 7/2013 |
| CN | 103206596 A | 7/2013 |
| CN | 203189459 U | 9/2013 |
| CN | 203344856 U | 12/2013 |

(56) References Cited

FOREIGN PATENT DOCUMENTS

| | | |
|---|---|---|
| CN | 104100609 A | 10/2014 |
| CN | 203991175 U | 12/2014 |
| DE | 1220673 B | 7/1966 |
| DE | 2527023 A1 | 12/1976 |
| DE | 2736012 A1 | 2/1978 |
| DE | 2703897 A1 | 8/1978 |
| DE | 3704190 A1 | 12/1987 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 10 2008 047 464 * | 4/2010 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 616140 A2 | 9/1994 |
| EP | 1132263 A1 | 9/2001 |
| EP | 1 243 471 * | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2 942 749 * | 9/2010 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| JP | H08200420 A | 8/1996 |
| JP | H0942233 A | 2/1997 |
| JP | 2000010514 A | 1/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | WO 2011/025606 * | 3/2011 |
| WO | 2013088447 A1 | 6/2013 |
| WO | 2013191622 A1 | 12/2013 |

OTHER PUBLICATIONS

Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013.

Willoughby, P., "Elastically Averaged Precision Alignment", B.S. Mechanical Engineering University of Pittsburgh, 2000.

Willoughby, P. & Slocum, A. (2004). Precision Connector Assembly using Elastic Averaging. Massachusetts Institute of Technology (MIT), Cambridge, MA, American Society for Precision Engineering. 3 pgs.

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

Awtar, S., et al., "Elastic Averaging in Flexure Mechanisms: A Multi-Beam Paralleaogram Flexture Case-Study", Proceedings of IDETC/CIE 2006, Paper DETC2006-99752, American Society of Mechanical Engineers (ASME), Sep. 2006; 7 pgs.

Balasubramaniam, M., et al.,"An Anti Backlash Two-Part Shaft Coupling With Interlocking Elastically Averaged Teeth" Precision Engineering, V. 26, No. 3, Elsevier Publishing, Jul. 2002; 28 pages.

Cross-sectional view of a prior art infrared welded assembly of BMW, Munich, Germany. Believed on the market since about Jan. 1, 2010, 1 page.

DeVita, L.M., et al.,"The Design of High Precision Parallel Mechnisms Using Binary Actuation and Elastic Averaging: With Application to MRI Cancer Treatment", 12th IFToMM World Contress (France), Jun. 2007; 6 pgs.

Gurung, S. (Dec. 2007). Passive Alignment of Micro-Fluidic Chips Using the Principle of Elastic Averaging. Thesis: Louisiana State University, Dept. of Mechanical Engineering; 74 pgs.

* cited by examiner

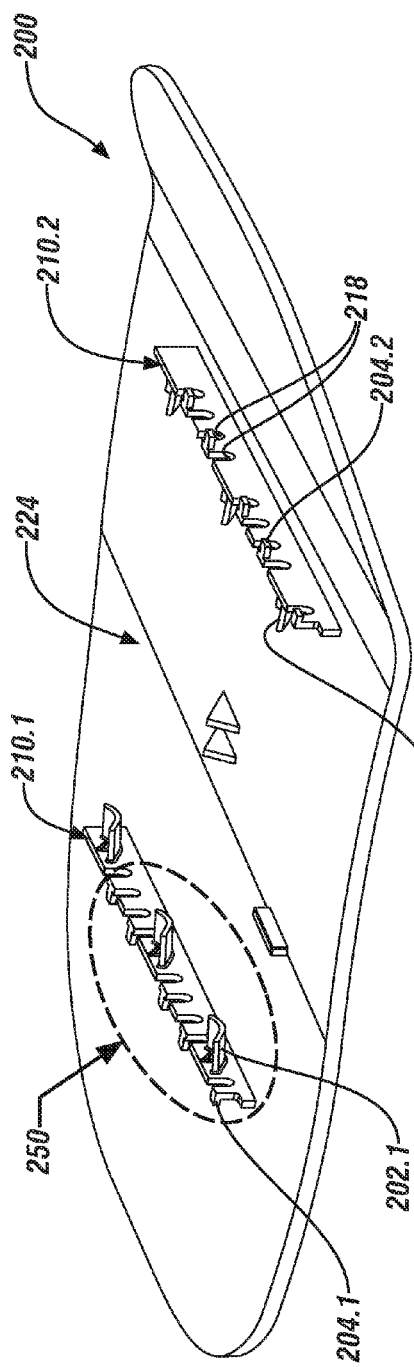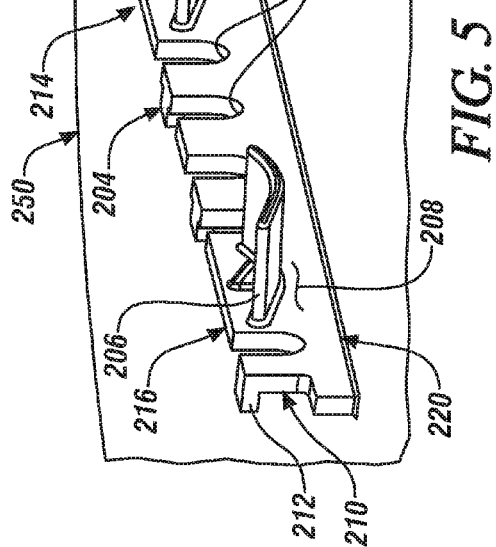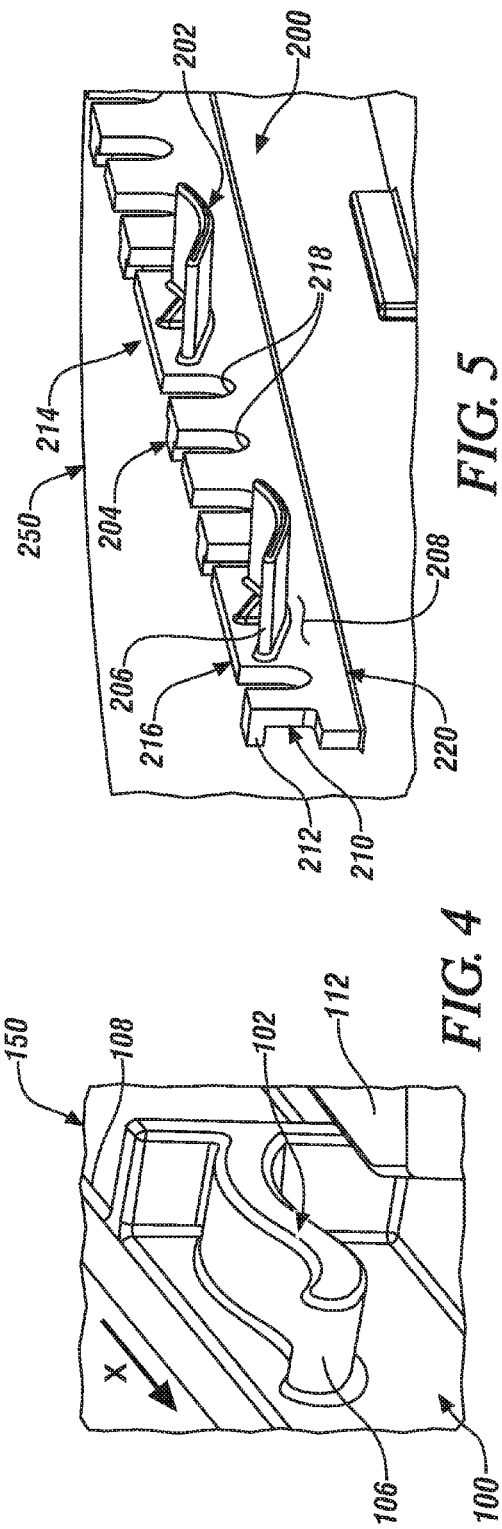

ALIGNMENT AND RETENTION SYSTEM FOR LATERALLY SLIDEABLY ENGAGEABLE MATING COMPONENTS

CROSS REFERENCE TO RELATED APPLICATIONS

This application claims the benefit of U.S. Provisional Application Ser. No. 61/974,107, filed Apr. 2, 2014, which is incorporated herein by reference in its entirety.

FIELD OF THE INVENTION

The subject invention relates to the art of alignment systems, more particularly to an elastically averaged alignment system, and even more particularly to an elastically averaged alignment system providing six-way alignment of laterally slideably engageable mating components on which the alignment system is incorporated.

BACKGROUND

Currently, components, particularly vehicular components such as those found in automotive vehicles, which are to be mated together in a manufacturing process are mutually located with respect to each other by alignment features that are oversized and/or undersized to provide spacing to freely move the components relative to one another to align them without creating an interference therebetween that would hinder the manufacturing process. One example includes two-way and/or four-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. In the case where these misaligned components are also part of another assembly, such misalignments can also affect the function and/or aesthetic appearance of the entire assembly. Regardless of whether such misalignment is limited to two components or an entire assembly, it can negatively affect function and result in a perception of poor quality.

Accordingly, the art of alignment systems can be enhanced by providing an alignment and retention system or mechanism that can ensure precise two-way, four-way or six-way alignment and fastening of two components via elastic averaging of a plurality elastically deformable alignment and retention elements disposed in mating engagement with a plurality of corresponding alignment features.

SUMMARY OF THE INVENTION

In one exemplary embodiment of the invention, an elastically averaged alignment system includes a first component and a second component. The first component includes at least one of a first alignment feature fixedly disposed with respect to the first component, and at least one of a second alignment feature fixedly disposed with respect to the first component. The second component includes at least one of a third elastically deformable alignment element fixedly disposed with respect to the second component, and at least one of a fourth elastically deformable alignment element fixedly disposed with respect to the second component. The first and second components are laterally slidably engageable with each other. A respective one of the third elastically deformable alignment element is configured and disposed to interferingly, deformably and matingly engage with a respective one of the first alignment feature. A respective one of the fourth elastically deformable alignment element is configured and disposed to interferingly, deformably and matingly engage with a respective one of the second alignment feature. Portions of the third and fourth elastically deformable alignment elements when engaged with respective ones of the first and second alignment features elastically deform to an elastically averaged final configuration that aligns the first component relative to the second component in six planar orthogonal directions by averaging the elastic deformation of the respective elastically deformable alignment elements.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 depicts an isometric view of the second component of FIG. 1 with a mating side of the second component visible, in accordance with an embodiment of the invention;

FIG. 4 depicts an expanded isometric view of an alignment feature of the first component, in accordance with an embodiment of the invention;

FIG. 5 depicts an expanded isometric view of an elastically deformable alignment element of the second component, in accordance with an embodiment of the invention;

DESCRIPTION OF THE EMBODIMENTS

Figure 1:
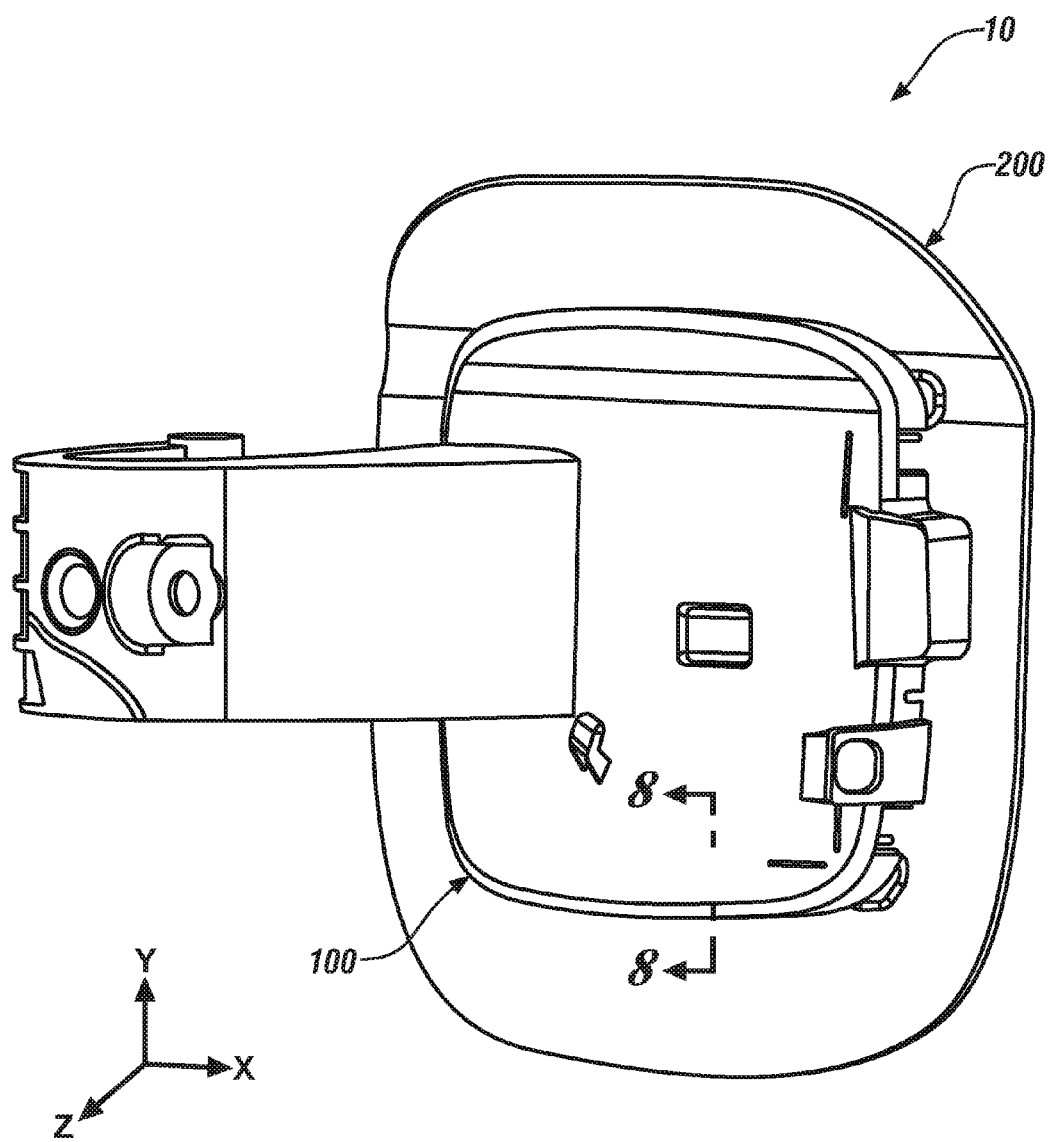
FIG. 1 depicts an assembly of a first component aligned and retained relative to a second component via an elastically averaged alignment and retention system, in accordance with an embodiment of the invention.

The following description is merely exemplary in nature and is not intended to limit the present disclosure, its application or uses. For example, the embodiments shown comprise vehicle components but the alignment system may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the at least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, now U.S. Pat. No. 8,695,201, the disclosure of which is incorporated by reference herein in its entirety. The embodiments disclosed above provide the ability to convert an existing component that is not compatible with the above-described elastic averaging principles, or that would be further aided with the inclusion of an elastically averaged alignment and retention system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled, towed, or movable conveyance suitable for transporting or supporting a burden.

Figure 2:
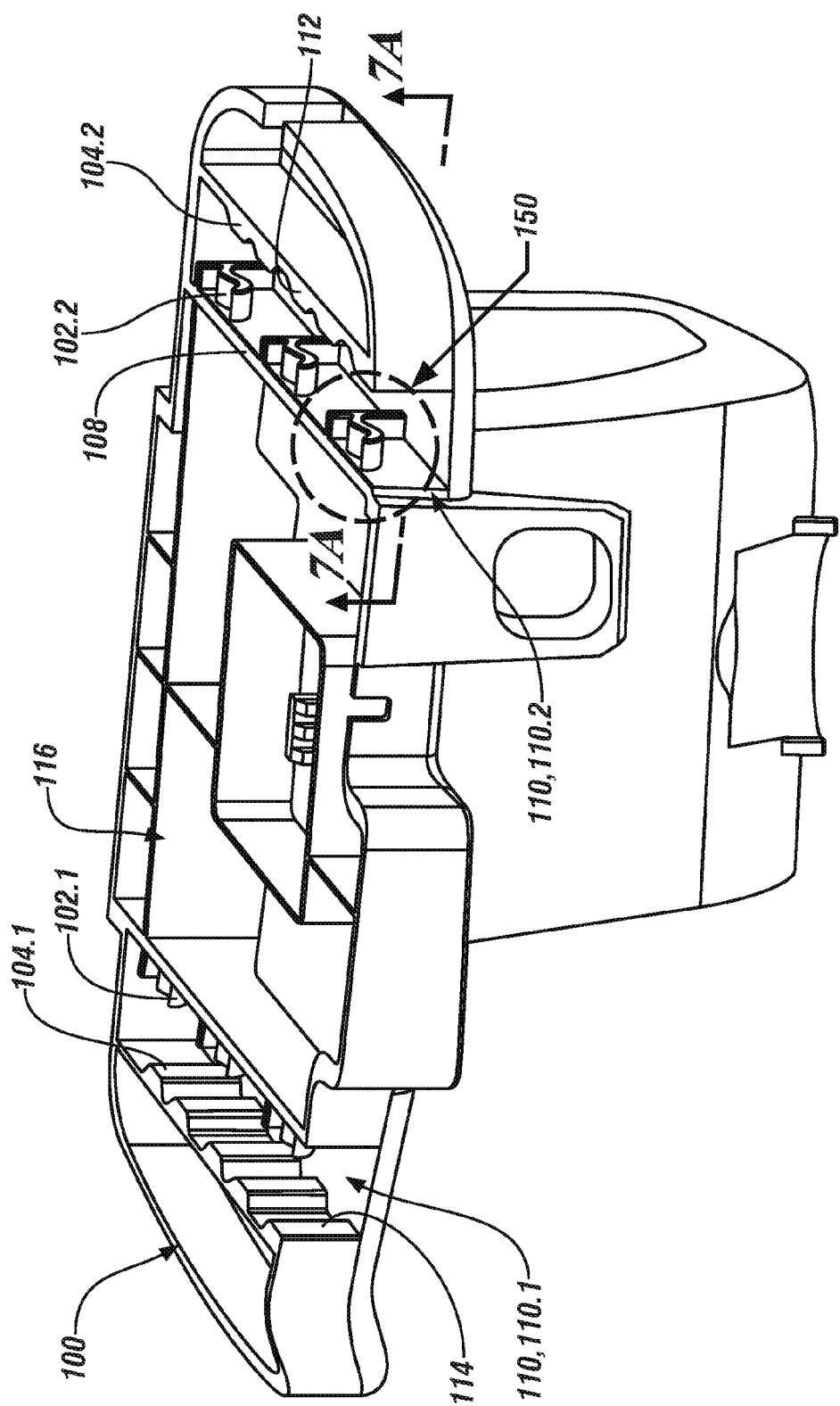
FIG. 2 depicts an isometric view of the first component of FIG. 1 with a mating side of the first component visible, in accordance with an embodiment of the invention.

In accordance with an example embodiment of the invention, and with reference to FIGS. 1-3, an elastically averaged alignment system 10 includes a first component 100 having at least one of a first alignment feature 102 (individually herein referred to by reference numerals 102.1, 102.2 . . . ) fixedly disposed with respect to the first component 100, or at least one of a second alignment feature 104 (individually herein referred to by reference numerals 104.1, 104.2 . . . ) fixedly disposed with respect to the first component 100, and a second component 200 having at least one of a third elastically deformable alignment element 202 (individually herein referred to by reference numerals 202.1, 202.2 . . . ) fixedly disposed with respect to the second component 200, and at least one of a fourth elastically deformable alignment element 204 (individually herein referred to by reference numerals 204.1, 204.2 . . . ) fixedly disposed with respect to the second component 200. The first and second components 100, 200 are laterally slideably engageable with each other in a manner that will be described in more detail below.

Figure 6:
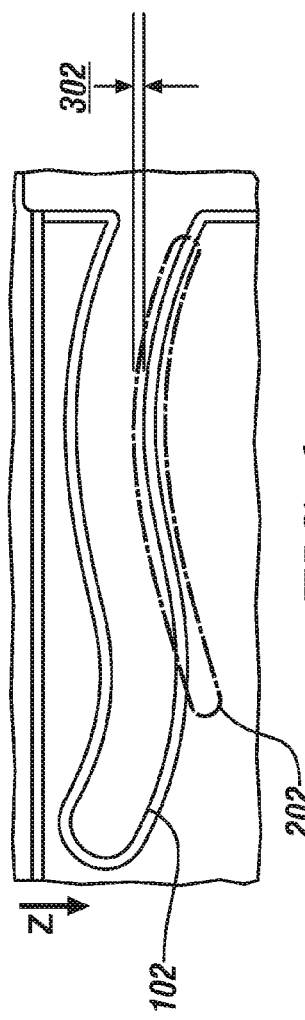
FIG. 6 depicts a side view of the elastically deformable alignment element of FIG. 5 elastically, deformably and matingly engaged with the alignment feature of FIG. 4, where the engagement surfaces are depicted overlapping to illustrate an interference fit therebetween, in accordance with an embodiment of the invention.
Figure 7A:
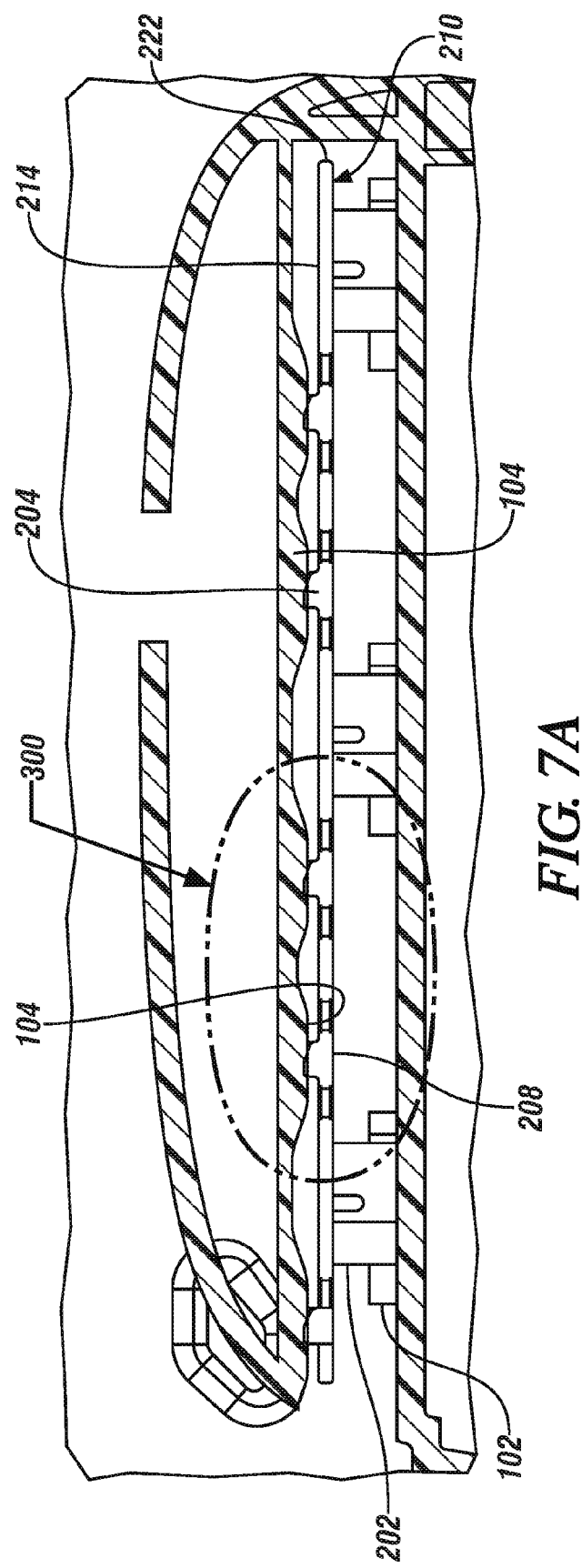
FIG. 7A depicts a cross section view through a portion of the assembly of FIG. 1, in accordance with an embodiment of the invention.
Figure 7B:
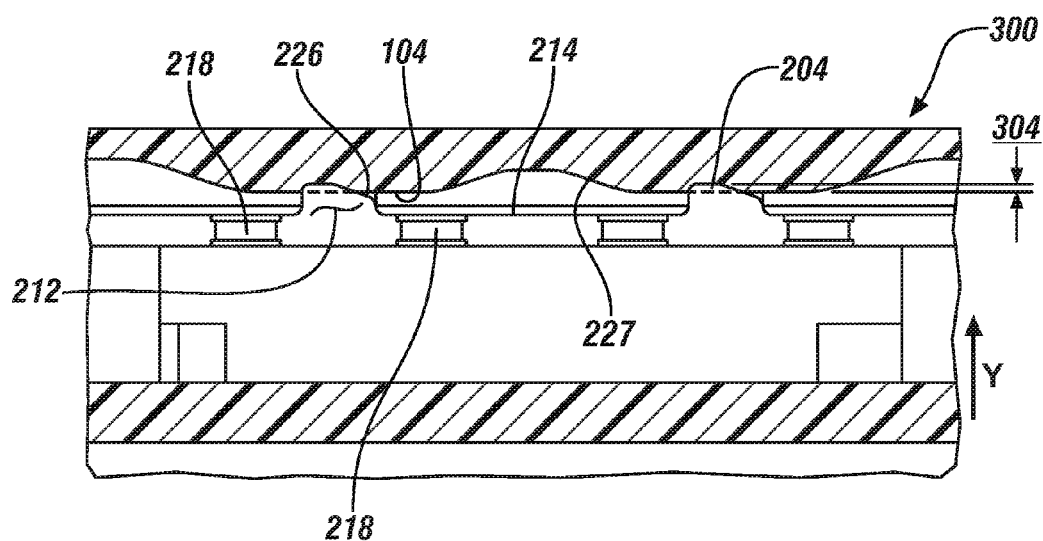
FIG. 7B depicts an expanded portion of the cross section view of FIG. 7A, in accordance with an embodiment of the invention.

With reference to FIGS. 4-7B (FIG. 4 depicts an expanded view of detail 150 of FIG. 2, FIG. 5 depicts an expanded view of detail 250 of FIG. 3, and FIG. 7B depicts an expanded view of detail 300 of FIG. 7A) in combination with FIGS. 1-3, respective ones of the third elastically deformable alignment element 202 are configured and disposed to interferingly, deformably and matingly engage with associated respective ones of the first alignment feature 102, and respective ones of the fourth elastically deformable alignment element 204 is configured and disposed to interferingly, deformably and matingly engage with a respective one of the second alignment feature 104. Portions of the third and fourth elastically deformable alignment elements 202, 204 when engaged with respective ones of the first and second alignment features 102, 104 elastically deform to an elastically averaged final configuration that aligns the first component 100 relative to the second component 200 in six planar orthogonal directions, such as the +/−x-direction, the +/−y-direction, and the +/−z-direction of an orthogonal coordinate system (see FIG. 1), for example, which is herein referred to as six-way alignment, by averaging the elastic deformation of the respective elastically deformable alignment elements 202, 204.

As depicted in FIGS. 2 and 3, the elastically averaged alignment system 10 includes an arrangement wherein the first component 100 has more than one of the first and second alignment features 102, 104, and the second component 200 has more than one of the third and fourth elastically deformable alignment elements 202, 204. The more than one of the third and fourth elastically deformable alignment elements 202, 204 are geometrically distributed with respect to respective ones of the more than one first and second alignment features 102, 104, such that portions of the elastically deformable alignment elements of respective ones of the more than one third and fourth elastically deformable alignment elements 202, 204, when engaged with respective ones of the more than one first and second alignment features 102, 104, elastically deform to an elastically averaged final configuration that further aligns the first component 100 relative to the second component 200 in six planar orthogonal directions.

As depicted in FIGS. 2 and 4, the first alignment feature 102 is formed by a projection 106 having a curved cross section that extends off of a first wall 108. In an embodiment, the curved cross section has a wave shape. As depicted in FIG. 2, the first wall 108 is on one side of a linear pocket 110 (individually herein referred to by reference numerals 110.1, 110.2 . . . ) formed in the first component 100, and a second wall 112 opposing the first wall 108 is on an opposite side of the linear pocket 110. The first alignment feature 102 is disposed extending sideways off of the first wall 108, and the second alignment feature 104 forms a portion of the second wall 112.

As depicted in FIGS. 3, 5, 7A and 7B, the third elastically deformable alignment element 202 is formed by a curved projection 206 having a curved cross section that extends sideways off of a first side 208 of a third wall 210 (individually herein referred to by reference numerals 210.1, 210.2 . . . ). In an embodiment, the curved cross section has a crescent shape.

As also depicted in FIGS. 3, 5, 7A and 7B, the fourth elastically deformable alignment element 204 is formed by a distal projection 212 that extends sideways off of a second side 214 of the third wall 210 at a distal end 216 of the third wall 210. The second side 214 of the third wall 210 faces away from the first side 208 of the third wall 210. In an embodiment, the third wall 210 has slots 218 on each side of the distal projection 212, where the slots 218 are open at and extend from the distal end 216 of the third wall 210 toward a proximal end 220 of the third wall 210. The portion of the third wall 210 between the slots 218 and having the distal projection 212 forms a cantilevered section of the third wall 210 that is capable of undergoing elastic deflection in a manner similar to how a cantilevered beam may be deflected at its free end.

In an embodiment, the first and second components 100, 200 are assembled together to arrive at the assembly depicted in FIG. 1 as follows. First, the mating side 224 of the second component 200 (mating side depicted in FIG. 3) is oriented proximate to and in face-to-face relationship with the mating side 116 of the first component (mating side depicted in FIG. 2), but laterally offset such that an inner end 222 (see FIG. 7A) of the third wall 210 of the second component 200 is poised for entry into the open end 114 (see FIG. 2) of the linear pocket 110 of the first component 100. Then, the second component 200 is laterally and slideably engaged with the first component 100 such that the third and fourth elastically deformable alignment elements 202, 204 fully engage with respective ones of the first and second alignment features 102, 104, as depicted in FIGS. 6, 7A and 7B. A ramped surface 226 (see FIG. 7B) on the distal projection 212, along with the curvatures of the first alignment feature 102 and third elastically deformable alignment element 202, facilitates the assembly of the first and second components 100, 200. As depicted in FIGS. 6 and 7B, the first alignment feature 102 and the third elastically deformable alignment element 202 are disposed in an interference fit condition 302 in a first z-direction, and the second alignment feature 104 and the fourth elastically deformable alignment element 204 are disposed in an interference fit condition 304 in a second y-direction orthogonal to the first z-direction, when the first and second components 100, 200 are fully engaged with each other, thereby elastically aligning and restraining the first and second components 100, 200 in the +/−y and +/−z directions. While the engagement surfaces depicted in FIGS. 6, 7A and 7B are depicted overlapping each other to illustrate interference fit conditions 302, 304 (dotted lines depicting the degree of overlap), it will be appreciated that this is for illustration purposes only so as to illustrate an interference fit between the respective parts, and that in actuality the elastically deformable alignment elements 202, 204 will elastically deform by the amount of the interference fit condition shown. For example, the cantilevered crescent shaped end of the third elastically deformable alignment element 202 will tend to flatten out slightly and bend slightly at the cantilevered free end by the amount of the interference fit condition 302, and the cantilevered distal projection 212 of the fourth elastically deformable alignment element 204 will tend to bend slightly at the cantilevered free end by the amount of the interference fit condition 304. Elastic alignment and restraint of the first and second components 100, 200 in the +/−x-directions is achieved by the crescent shaped third elastically deformable alignment element 202 being elastically deformably nestled in a trough of the wave shaped first alignment feature 102.

Figure 8:
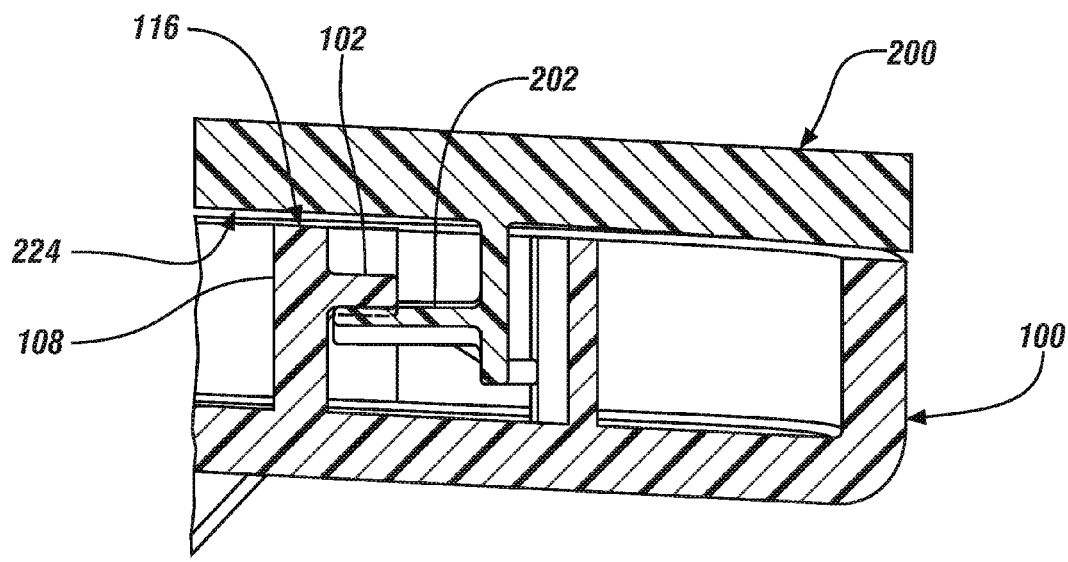
FIG. 8 depicts a cross section view through another portion of the assembly of FIG. 1, in accordance with an embodiment of the invention.

With reference now to FIG. 8, it can be seen that the first and second components 100, 200 are tightly fit relative to each other by the third elastically deformable alignment element 202 of the second component 200 being interferingly captured under the first alignment feature 102 of the first component 100, which pulls the mating side 224 of the second component 200 snugly against the first wall 108, and therefore snugly against the mating side 116, of the first component 100, with little or no gap therebetween. As depicted in FIG. 8, only an end portion of the crescent shaped cantilevered projection of the third elastically deformable alignment element 202 overlaps the wave shaped projection of the first alignment feature 102, which provides for cantilevered elastic deflection of the third elastically deformable alignment element 202 when engaged with the first alignment feature 102.

With reference now back to FIGS. 2 and 3, an embodiment includes an arrangement where there are two sets of the first and second alignment features 102, 104 (denoted by 102.1, 102.2, 104.1, 104.2) arranged in respective spaced-apart linear pockets 110.1, 110.2, and two sets of the third and fourth elastically deformable alignment elements 202, 204 (denoted by 202.1, 202.2, 204.1, 204.2) arranged on respective spaced-apart linear walls 210.1, 210.2. Like features and elements of the two sets are arranged so that any biasing forces they create between them oppose each other. For example, when elastically, deformably and matingly engaged with each other, the fourth elastically deformable alignment element 204.1 of the first set (toward the left in FIG. 3) is elastically deformed inward thereby creating an outward biasing force on the second alignment feature 104.1 of the first set (toward the left in FIG. 2), and the fourth elastically deformable alignment element 204.2 of the second set (toward the right in FIG. 3) is elastically deformed inward thereby creating an outward biasing force on the second alignment feature 104.2 of the second set (toward the right in FIG. 2), resulting in two outward biasing forces that oppose each other. The same result would be achieved if the placement of the first and second alignment features of the first and second sets, and the corresponding first and second elastically deformable alignment elements of the first and second sets, were switched. As such, the scope of the invention is not limited to only the orientation of features and elements depicted in FIGS. 2 and 3.

In view of all that is disclosed, illustrated, described, and incorporated by reference herein, it will be appreciated that the scope of the invention is not limited to only the use of the herein disclosed elastically deformable alignment elements and the corresponding alignment features, but also encompasses the use of such elements and features in combination with other elastic averaging alignment features, male or female.

When the first component 100 and second component 200 are components of a vehicle, an advantageous assembly results because the clamping force, together with the elastic deformation of the alignment features that has these parts in pressing contact already, reduces the tendency of the components to vibrate or rattle against one another, and thus improves the noise, vibration and harshness (NVH) characteristics of the components and the vehicle in which they are installed. The selective engagement of the elastically deformable alignment elements and the corresponding alignment features also provides a stiffened assembly of the first component 100 and second component 200 when the first and second components are mutually mated to each other, including a stiffness that is greater than that realized by using the alignment features alone, since the clamping force between the first component and second component increases the stiffness of the assembly, for example. In an embodiment, the first component 100 is a hinge portion of a fuel door for a vehicle, and the second component 200 is a cover portion of the fuel door.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:
1. An elastically averaged alignment system, comprising:
a first component comprising at least one first alignment feature fixedly disposed with respect to the first component, and at least one second alignment feature fixedly disposed with respect to the first component;
a second component comprising at least one first elastically deformable alignment element fixedly disposed with respect to the second component, and at least one second elastically deformable alignment element fixedly disposed with respect to the second component;
wherein the first and second components are laterally slidably engageable with each other;
wherein the first elastically deformable alignment element is configured and disposed to interferingly, deformably and matingly engage with the first alignment feature;
wherein the second elastically deformable alignment element is configured and disposed to interferingly, deformably and matingly engage with the second alignment feature;
wherein portions of the first and second elastically deformable alignment elements when engaged with respective ones of the first and second alignment features elastically deform to an elastically averaged final configuration that aligns the first component relative to the second component in six orthogonal directions by averaging the elastic deformation of the portions of the first and second elastically deformable alignment elements;
wherein the first elastically deformable alignment element comprises a curved projection having a curved cross section that extends from of a first side of a third wall; and
wherein the second elastically deformable alignment element comprises a distal projection that extends from a second side of the third wall at a distal end of the third wall, the second side of the third wall facing away from the first side of the third wall.

2. The elastically averaged alignment system of claim 1, wherein the first alignment feature comprises a projection having a curved cross section that extends from a first wall.

3. The elastically averaged alignment system of claim 2, wherein the curved cross section of the first alignment feature is sinusoidal shaped.

4. The elastically averaged alignment system of claim 1, wherein:
the first component comprises a pocket having opposing first and second side walls;
the first alignment feature is disposed on the first side wall; and
the second alignment feature is a portion of the second side wall.

5. The elastically averaged alignment system of claim 1, wherein the curved cross section is a crescent shaped.

6. The elastically averaged alignment system of claim 1, wherein:
the third wall comprises slots, the slots forming cantilevered sections of the third wall, the distal projection extends from one of said cantilevered sections.

7. The elastically averaged alignment system of claim 1, wherein:
the first alignment feature and the first elastically deformable alignment element extend in a first direction; and the second alignment feature and the second elastically deformable alignment element extend in a second direction orthogonal to the first direction.

8. The elastically averaged alignment system of claim 1, wherein:
   the first component comprises a first mating side;
   the second component comprises a second mating side; and
   the first elastically deformable alignment element when interferingly, deformably and matingly engaging with the first alignment feature biases the first and second mating sides toward each other.

9. The elastically averaged alignment system of claim 1, wherein:
   the first component is a hinge portion; and
   the second component is a cover portion.

10. The elastically averaged alignment system of claim 1, wherein:
    the first component comprises a first portion of a fuel door; and
    the second component comprises a second portion of the fuel door.

* * * * *